US010933855B2

(12) United States Patent
Dhingra et al.

(10) Patent No.: US 10,933,855 B2
(45) Date of Patent: Mar. 2, 2021

(54) DRIFT MODE FOR ELECTRONIC HANDBRAKE

(71) Applicant: Robert Bosch GmbH, Stuttgart (DE)

(72) Inventors: Vishisht Dhingra, Canton, MI (US); Mohammad Subhi AlQawasmeh, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 16/280,426

(22) Filed: Feb. 20, 2019

(65) Prior Publication Data

US 2019/0256071 A1 Aug. 22, 2019

Related U.S. Application Data

(60) Provisional application No. 62/632,731, filed on Feb. 20, 2018.

(51) Int. Cl.
*B60T 13/66* (2006.01)
*B60T 7/08* (2006.01)
*B60T 15/04* (2006.01)
*B60T 17/18* (2006.01)
*B60T 7/12* (2006.01)

(52) U.S. Cl.
CPC ............ *B60T 13/662* (2013.01); *B60T 7/085* (2013.01); *B60T 7/12* (2013.01); *B60T 15/041* (2013.01); *B60T 17/18* (2013.01); *B60T 2270/10* (2013.01)

(58) Field of Classification Search
CPC ... B60T 7/08; B60T 7/085; B60T 7/10; B60T 7/12; B60T 8/17; B60T 8/1755; B60T 8/17551; B60T 8/171; B60T 13/662; B60T 15/041; B60T 17/18
See application file for complete search history.

(56) References Cited

U.S. PATENT DOCUMENTS

| | | | |
|---|---|---|---|
| 4,168,865 A | 9/1979 | Bogenschutz | |
| 9,187,121 B2 | 11/2015 | Gerecke et al. | |
| 9,242,624 B2 * | 1/2016 | Huennekens | B60T 8/17 |
| 9,457,782 B2 | 10/2016 | Yao | |
| 9,744,950 B1 * | 8/2017 | Lemmer | B60T 13/588 |
| 9,744,954 B2 | 8/2017 | Beer et al. | |
| 10,272,925 B1 * | 4/2019 | Wicks | B60T 8/1755 |
| 2010/0217486 A1 * | 8/2010 | Taguchi | B60T 7/22 701/41 |
| 2016/0375952 A1 | 12/2016 | Lin | |
| 2017/0051697 A1 | 2/2017 | Campbell | |

* cited by examiner

*Primary Examiner* — Thomas J Williams
(74) *Attorney, Agent, or Firm* — Michael Best & Friedrich LLP

(57) ABSTRACT

Systems and methods for braking a vehicle. The method includes receiving, with an electronic controller, a signal from a mode activation mechanism indicating the vehicle is in a first mode and receiving, with the electronic controller, a signal from an input mechanism. If the vehicle is in the first mode and an operator of the vehicle actuates the input mechanism, the electronic controller sends a signal to a brake of the vehicle to lock up a wheel of the vehicle.

18 Claims, 3 Drawing Sheets

DRIFT MODE FOR ELECTRONIC HANDBRAKE

CROSS REFERENCE TO RELATED APPLICATIONS

This application claims priority to U.S. Provisional Patent Application No. 62/632,731, filed Feb. 20, 2018, the entire contents of which is incorporated by reference in its entirety.

BACKGROUND

Many vehicles are equipped with electronic parking brakes (EPBs) instead of manual hand brakes to maintain a vehicle in a parked or stopped position. EPBs may be operated by a switch or button. In response to the switch or button being selected, brakes are applied. For example, a brake caliper is contracted or closed and brake pads are squeezed against a brake disc for each wheel of the vehicle. Friction between the pads and the disc prevent the disc (and the wheel to which it is attached) from moving, which maintains the vehicle in a parked or stopped position.

SUMMARY

While EPBs are effective and not objectionable to most drivers, a niche market of vehicle owners may still desire to have manual control of the handbrake to apply a braking force to only the rear wheels of the vehicle. This allows the owner of the vehicle to intentionally lock up the rear wheels of the vehicle, producing a "drifting" effect, where the vehicle slides across a driving surface while under control of an operator of the vehicle. "Lock up" occurs when the braking force is sufficient to stop a wheel from rolling or rotating, but friction between the wheel (or, more particularly, tire) and the road surface is such that vehicle momentum causes the wheel to slide rather than rotate. With current EPBs, braking is achieved via a supplementary system that uses, for example, small electric motors to apply brakes to the rear wheels. These small electric motors are, in general, not powerful enough to be useful other than to maintain a vehicle in a stopped position. Generally, the motors are not designed to apply force sufficient to stop a moving vehicle. Stopping a moving vehicle is, generally, accomplished using a hydraulic braking system that is generally designed to generate significant braking force and to brake all wheels of the vehicle at once. Anti-lock braking and other stability control functions generally make it difficult to lock up a selected subset of wheels. In addition, applying the EPB at speed is generally prohibited by computer control to reduce the possibility of damage to the electric motors used in the EPB system. The EPB cannot, in general be used to lock up wheel, unlike a manual parking brake.

Therefore, a braking system incorporating an EPB that allows operators of the vehicle to control when to lock up the rear wheels is needed.

Embodiments described herein relate to applying a brake to at least one rear wheel of a vehicle when a switch is activated.

One embodiment provides a braking system. The braking system includes a brake configured to be applied to a wheel of the vehicle; a mode activation mechanism; an input mechanism; and an electronic controller configured to receive a signal from the mode activation mechanism indicating the vehicle is in a performance mode; receive a signal from the input mechanism from an operator of the vehicle; and, if the vehicle is in the performance mode and the operator actuates the input mechanism, send a signal to a hydraulic component of the brake to actuate and lock up the rear wheel of the vehicle.

Another embodiment provides a method for braking a vehicle. The method includes receiving, with an electronic controller, a signal from a mode activation indicating the vehicle is in a performance mode and receiving, with the electronic controller, a signal from an input mechanism. If the vehicle is in the performance mode and an operator of the vehicle actuates the input mechanism, the electronic controller sends a signal to a brake of the vehicle to lock up a wheel of the vehicle.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "control units" and "controllers" described in the specification can include one or more electronic controllers, one or more memories including non-transitory computer-readable media, one or more input/output interfaces, one or more application specific integrated circuits (ASICs) and other circuits, and various connections (for example, wires, printed traces, and busses) connecting the various components.

Figure 1:
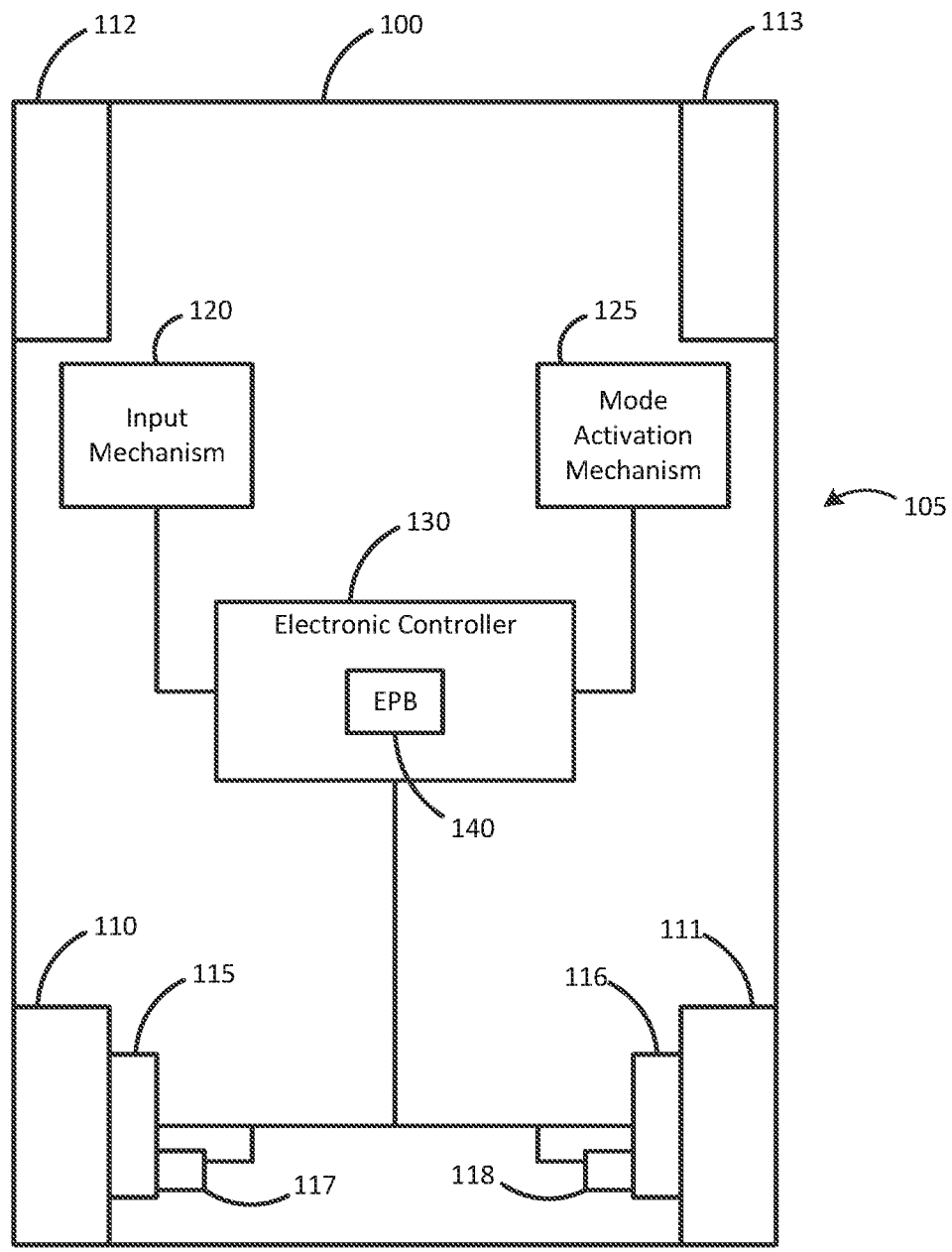
FIG. 1 is a block diagram of a vehicle equipped with a braking system according to one embodiment.

FIG. 1 illustrates a vehicle 100 equipped with a braking system 105 according to one embodiment. The vehicle 100 includes rear wheels 110-111, front wheels 112-113, and brakes 115-116. The braking system 105 includes a parking brake button (or, more generally an input mechanism) 120, a mode activation mechanism 125, and an electronic controller 130. The braking system 105 may include other components, such as a brake pedal.

The vehicle 100 may be a four-wheeled vehicle that includes at least the two rear wheels 110-111(such as an automobile). However, in other embodiments, the vehicle 100 may have more or less wheels and more or less rear wheels. Each of the wheels of the vehicle (including the rear wheels 110-111) has an associated brake, which in the example, includes brakes 115-116. Each of the brakes 115-116 may include, for example, a brake disc, a brake caliper, brake pads, and hydraulic components (for example, hydraulically driven pistons) that actuate the brake caliper to apply the brake pads to the rear wheels 110-111. Brakes 115-116 also includes an additional motor 117-118 that is controlled or actuated to open and close the brake caliper. When the vehicle 100 is at a standstill, the brakes 115-116 operate as a parking brake. While disc brakes are described in the example provided, other types of brakes could be used, for example, drum brakes.

As noted, the brake calipers may be moved by hydraulically-driven pistons positioned within cylinders containing hydraulic fluid that is compressed in hydraulic system. The pistons cause the brake calipers to move the brake pads into contact with the brake discs of the rear wheels 110-111. At the right speed and traction, the brake calipers moving the brake pads into contact with the brake discs causes the rear wheels 110-11 to lock up.

As noted, rear brakes 115-116 includes additional motors 117-118 that are electrically connected to the electronic controller 130. Each motor is configured, in response to receiving a signal, to move brake calipers of the brakes 115-116 into contact with brake discs connected to the rear wheels 110-111 to apply a braking force when the vehicle 100 is at a standstill. The hydraulic components of the brakes 115-116 are also controllable via the electronic controller 130 to actuate and bring the brake discs in contact with the rear wheels 110-111. It is preferable to actuate the hydraulic components of the brakes 115-116 as the hydraulic components provide more braking power than the additional motors 117-118.

The braking system 105 also includes an electronic parking brake (EPB) control 140. The EPB control 140 is a software application stored within a memory of the electronic controller 130 (as described below) that, when executed, instructs the electronic controller 130 to send a signal to the braking system 105 to lock up rear wheels 110-111 of the vehicle 100 using hydraulics. The EPB control 140 is activated when an operator of the vehicle 100 actuates the parking brake button 120. For example, the parking brake button 120 may be a switch or a button that, when actuated, sends a signal to the electronic controller 130. The parking brake button 120 may be located next to a gear shifter of the vehicle 100, on a dashboard of the vehicle 100, on a steering wheel of the vehicle 100, or any other place accessible to the operator of the vehicle 100.

The braking system 105 also includes a mode activation mechanism 125. Similar to the parking brake button 120, the mode activation mechanism 125 may be a switch or a button. When the mode activation mechanism 125 is actuated, a signal is sent to the electronic controller 130. The signal indicates to the electronic controller 130 to operate in a performance mode. The performance mode may be a sports mode, a track mode, a racing mode, or a drift mode. The performance mode generally indicates to the electronic controller 130, via the signal, that the EPB control 140 should not be used when the parking brake button 120 is actuated when the vehicle 100 is in motion and, rather, only the brakes 115-116 for the rear wheels 110-111 should be applied when the parking brake button 120 is actuated, not all brakes for all wheels of the vehicle 100.

The electronic controller 130 is electrically connected to the parking brake button 120 and the mode activation mechanism 125. The electronic controller 130 may also be connected to hydraulic components of the braking system 105 (or to a separate electronic controller that controls the hydraulic components of the braking system 105). The electronic controller 130 is configured to receive signals from 1) the parking brake button 120 (indicating that the EPB control 140 has been actuated) and 2) the mode activation mechanism 125 (indicating that the performance mode is active or inactive). The electronic controller 130 is also configured to send a signal to the motors 117-118 of the brakes 115-116 to apply the brakes 115-116 to the rear wheels 110-111 if the vehicle 100 is at a standstill.

Figure 2:
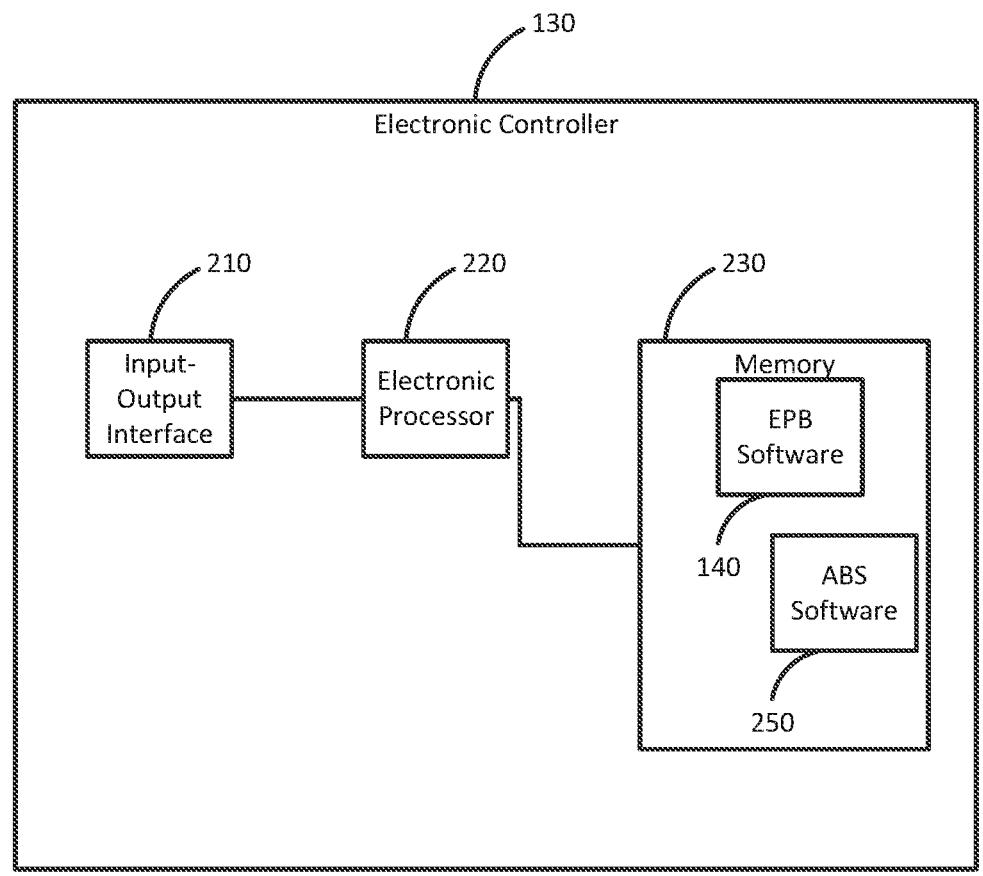
FIG. 2 illustrates an electronic controller according to one embodiment.

FIG. 2 illustrates the electronic controller 130 according to one embodiment. In the example shown, the electronic controller 130 includes an input-output interface 210, an electronic processor 220, and a memory 230 (for example, non-transitory, machine-readable memory). The electronic processor 220 is communicatively connected to the input-output interface 210 and the memory 230. The memory 230 may include the software for the EPB control 140. The electronic processor 220 is configured to access the memory 230 and, among other things, execute instructions for the EPB control 140. The memory may also include anti-lock braking software 250 which is configured to control brakes of the vehicle 100 from locking. In some embodiments, the anti-lock braking software 250 may be stored in a separate memory or contained in a separate electronic controller in the braking system 105.

Figure 3:
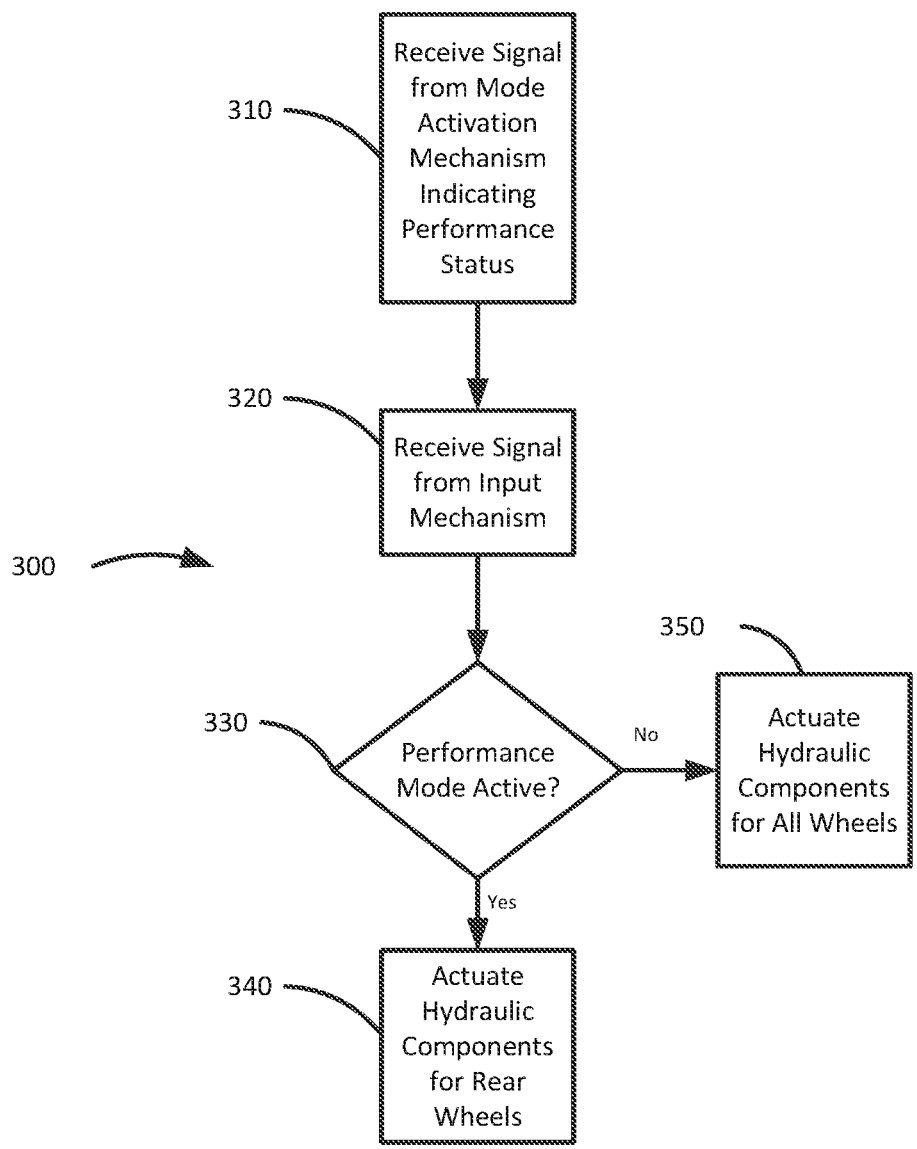
FIG. 3 illustrates a method of applying brakes to rear wheels of a vehicle according to one embodiment.

FIG. 3 illustrates a method 300 of applying the brakes 115-116 to the rear wheels 110-111 according to one embodiment.

The method 300 includes receiving, with the electronic controller 130, a signal from the mode activation mechanism 125 indicating the performance mode status (at block 310). For example, if the performance mode is currently inactive, the operator of the vehicle 100 actuates the mode activation mechanism 125 when he or she wishes to operate in the performance mode. In contrast, if the performance mode is currently active, the operator of the vehicle 100 actuates the mode activation mechanism 125 when he or she wishes to disable the performance mode.

The mode activation mechanism 125 may send a constant signal to the electronic controller 130 (for example, a switch is turned "on"). In another embodiment, the mode activation mechanism 125 sends a non-constant signal (for example, a button being pressed) to the electronic controller 130. Receiving the non-constant signal instructs the electronic controller 130 to save a value indicating that the performance mode is active in the memory 230. The electronic controller 130 then accesses the memory 230 to determine if the performance mode has been activated. If the non-constant signal is received again, the electronic controller 130 overwrites the saved value in the memory 230 to indicate that the performance mode is inactive.

The method 300 includes receiving, with the electronic controller 130, a signal from the input mechanism 120 to execute the EPB control 140 and actuate the brakes of the vehicle 100 (at block 320). For example, when the operator of the vehicle 100 brings the vehicle 100 to a complete stop and wants to apply the EPB control 140, the operator actuates the parking brake button 120 (for example, presses a button or flips a switch). In another example, the operator of the vehicle 100 wants to "drift" or purposefully lock the rear wheels 110-111 in order to slide in a controlled manner across a driving surface (when the vehicle 100 is in the performance mode).

The electronic controller 130, once it has received the signal from the parking brake button 120, then determines if the vehicle 100 is operating in the performance mode (at block 330). For example, the electronic controller 130 may read the memory 230 or receive a signal to determine if the vehicle 100 is in the performance mode.

If the electronic controller 130 determines that the vehicle 100 is not operating in the performance mode when the parking brake button 120 is actuated, the electronic controller 130 is configured to send a signal to actuate hydraulic components of brakes for all wheels of the vehicle 100 to apply a parking brake as normal (at block 350). The electronic controller 130 may also, in some embodiments, determine to lock all wheels of the vehicle 100 if the vehicle 100 is not operating in the performance mode and the vehicle 100 is at a standstill. In contrast, if the parking brake button 120 is actuated, the vehicle 100 is not in the performance mode, and the vehicle 100 is in motion, the electronic controller 130 sends a signal to the hydraulic components of the braking system 105 (or to a separate electronic controller that controls the hydraulic components) to apply hydraulic pressure with the hydraulic components of the brakes at all wheels of the vehicle 100 to bring the vehicle 100 to a stop in a controlled manner. For example, when the vehicle 100 is in motion and the input mechanism 120 is actuated, the brakes at all wheels of the vehicle 100 are actuated on and off to slowly bring the vehicle 100 to a safe speed or a stop. By actuating the brakes on and off, potential hazardous braking conditions are avoided. In some embodiments, an anti-lock braking system is also actuated when the input mechanism 120 is actuated while the vehicle 100 is not in the performance mode.

If the electronic controller 130 determines that the vehicle 100 is operating in the performance mode when the input mechanism 120 is actuated, the electronic controller 130 sends a signal to the hydraulic components of the brakes 115-116 to actuate and apply the brakes 115-116 to the rear wheels 110-111, locking up the rear wheels 110-111 and allowing the vehicle 100 to "drift."

Once the electronic controller 130 stops receiving a signal from the input mechanism 120, the electronic controller 130 is configured to send a signal to the brakes 115-116 (for example, to the hydraulic components to actuate the brakes 115-116 of the rear wheels 110-111) to stop applying the hydraulic components of the brakes 115-116 and, as a consequence, end braking of the rear wheels 110-111.

In some embodiments, the vehicle 100 is equipped with an anti-lock brake system (ABS) that includes anti-lock braking software 250. In these embodiments, when the input mechanism 120 is actuated, the ABS software 250 is configured to (under normal driving circumstances, for example not operating in the performance mode) prevent the brakes from locking. The electronic controller 130, therefore, may be configured to send a signal to the ABS software 250 to allow the rear wheels 110-111 to lock while the input mechanism 120 is actuated and the vehicle 100 is operating in the performance mode.

In embodiments where the vehicle 100 is a four-wheel drive, all-wheel drive, or rear-wheel drive vehicle, the electronic controller 130 may be configured to send a signal to a separate electronic controller, such as an engine or transmission electronic controller, indicating to disengage a clutch of the engine. If the clutch is engaged when the rear wheels 110-111 lock, an engine of the vehicle 100 may stall. Therefore, the electronic controller 130 sends a signal to the engine or transmission electronic controller to prevent the engine stall.

In some embodiments, the electronic controller 130 receives signals from stability sensors in the vehicle 100. When the vehicle 100 is operating in the performance mode and the input mechanism 120 is actuated, the electronic controller 130 may ignore certain data sent from the stability sensors, as the data may falsely indicate lost stability when an operator of the vehicle 100 is "drifting". In these embodiments, the electronic controller 130 may also determine that data from the stability sensors indicates that the "drift" has become unsafe. For example, the drift is unsafe if a speed of the vehicle 100 is excessive for the drift (e.g., the vehicle 100 is in danger of rolling over or sliding out of control at the speed during the drift), a vehicle body angle of the vehicle 100 is unsafe for the direction and speed of the drift, or if a panicked driver behavior is detected. A panicked driver behavior may be a sudden change in steering angle of a steering device of the vehicle 100, rapid actuation of a brake pedal of the vehicle 100, or other behavior detected by one or more sensors that indicates that the operator of the vehicle 100 no longer is in control of the vehicle 100 during the drift. In some embodiments, the panicked driver behavior may be pre-programmed and customizable by a manufacturer of the vehicle 100 or an operator of the vehicle 100 to identify individual behaviors indicating driver panic.

If the drift is found to be unsafe, the electronic controller 130 may send a signal to actuate controlled braking on the front wheels 112-113 and the rear wheels 110-111 on the vehicle 100 in order to bring the vehicle 100 to a safe stop. The brakes for the front wheels 112-113 and the rear wheels 110-111 may be actuated on and off in any combination to bring the vehicle 100 to a safe stop. The electronic controller 130 may also send the signal to actuate the brakes on the front wheels 112-113 and the rear wheels 110-111 if the electronic controller 130 determines that an operator of the vehicle 100 is repeatedly pressing a brake pedal or otherwise attempting to stop the "drift" (for example, by receiving a signal from a brake pedal sensor).

Various features, advantages, and embodiments are set forth in the following claims.

What is claimed is:

1. A braking system for a vehicle, comprising:
   a brake configured to be applied to a rear wheel of the vehicle;
   a mode activation mechanism;
   an input mechanism; and
   an electronic controller configured to:
      receive a signal from the mode activation mechanism indicating the vehicle is in a performance mode,
      receive a signal from the input mechanism from an operator of the vehicle, and
      when the vehicle is in the performance mode and the operator actuates the input mechanism, send a signal to the brake to lock up the rear wheel of the vehicle,
   wherein the electronic controller is electrically connected to a brake pedal sensor, and
   wherein the electronic controller is further configured to actuate a brake of a front wheel of the vehicle in response to receiving a signal from the brake pedal sensor, the signal indicating that the operator of the vehicle is repeatedly pressing a brake pedal of the vehicle.

2. A braking system comprising:
   a rear brake configured to apply, to a rear wheel of a vehicle, a braking force that locks up the rear wheel;
   a mode activation mechanism configured to output, from the mode activation mechanism, a status signal that indicates whether a performance mode of the vehicle is active or inactive;

an input mechanism configured to output, from the input mechanism when an operator actuates the input mechanism, an actuation signal that indicates an actuation of the input mechanism; and an electronic controller that is electrically connected to the rear brake, the mode activation mechanism and the input mechanism in a manner that permits the electronic controller to:

receive, after the electronic controller receives the status signal from the mode activation mechanism, the actuation signal from the input mechanism, determine, after the electronic controller receives the actuation signal from the input mechanism, the performance mode, and control, when the electronic controller determines from the status signal that the performance mode is active, the rear brake to apply the braking force in a manner that causes the rear brake to lock up the rear wheel, wherein the electronic controller is electrically connected to a stability sensor in a manner that permits the electronic controller to ignore, when the performance mode is active, a signal from the stability sensor.

3. The braking system of claim 2, wherein the electronic controller is configured to:

send, to a separate electronic controller in the vehicle, a signal that disengages a clutch of an engine in the vehicle.

4. The braking system of claim 2, wherein the electronic controller is configured to:

send, when the signal from the stability sensor indicates an unsafe condition, a signal to actuate controlled braking of at least one wheel of the vehicle other than the rear wheel.

5. The braking system of claim 4, wherein the unsafe condition is a condition from the group consisting of an excessive speed of the vehicle during a drift, an unsafe body angle of the vehicle, and a panicked driver behavior.

6. The braking system of claim 5, wherein the panicked driver behavior is customizable by the operator.

7. The braking system of claim 2, wherein the electronic controller is electrically connected to a brake pedal sensor in a manner that permits the electronic controller to:

receive, from the brake pedal sensor, a sensor signal indicating that the operator is repeatedly pressing a brake pedal of the vehicle.

8. The braking system of claim 7, wherein the electronic controller is electrically connected to a brake pedal sensor in a manner that permits the electronic controller to:

actuate, in response to the signal, a brake of a front wheel of the vehicle.

9. The braking system of claim 2, wherein the electronic controller is configured to:

control, in the absence of the operator actuating the input mechanism, the rear brake in a manner that inhibits the rear brake from locking up the rear wheel.

10. The braking system of claim 2, wherein the electronic controller is configured to:

control, when the electronic controller determines from the status signal that the performance mode is inactive, the rear brake in a manner that inhibits the rear brake from locking up the rear wheel.

11. A method for braking a vehicle, the method comprising:

outputting, from a mode activation mechanism to an electronic controller, a status signal that indicates whether a performance mode of a vehicle is active or inactive;

outputting, from an input mechanism to the electronic controller when an operator actuates the input mechanism, an actuation signal that indicates an actuation of the input mechanism;

receiving, by the electronic controller after the electronic controller receives the status signal from the mode activation mechanism, the actuation signal from the input mechanism;

determining, by the electronic controller after the electronic controller receives the actuation signal from the input mechanism, the performance mode;

controlling, by the electronic controller when the electronic controller determines from the status signal that the performance mode is active, a rear brake to apply a braking force in a manner that causes the rear brake to lock up a rear wheel;

applying, by the rear brake, the braking force to the rear wheel of the vehicle that locks up the rear wheel; and ignoring, by the electronic controller when the performance mode is active, a signal from a stability sensor.

12. The method of claim 11, further comprising:

sending, from the electronic controller to a separate electronic controller in the vehicle, a signal that disengages a clutch of an engine in the vehicle.

13. The method of claim 11, further comprising:

sending, by the electronic controller when the signal from the stability sensor indicates an unsafe condition, a signal to actuate controlled braking of at least one wheel of the vehicle other than the rear wheel.

14. The method of claim 13, wherein the unsafe condition is a condition from the group consisting of an excessive speed of the vehicle during a drift, an unsafe body angle of the vehicle, and a panicked driver behavior.

15. The method of claim 13, wherein the panicked driver behavior is customizable by the operator.

16. The method of claim 11, further comprising:

receiving, by the electronic controller from the brake pedal sensor, a sensor signal indicating that the operator is repeatedly pressing a brake pedal of the vehicle, and actuating, by the electronic controller in response to the signal, a brake of a front wheel of the vehicle.

17. The method of claim 11, further comprising:

controlling, by the electronic controller in the absence of the operator actuating the input mechanism, the rear brake in a manner that inhibits the rear brake from locking up the rear wheel.

18. The method of claim 11, further comprising:

controlling, by the electronic controller when the electronic controller determines from the status signal that the performance mode is inactive, the rear brake in a manner that inhibits the rear brake from locking up the rear wheel.

* * * * *